(12) United States Patent
Makam et al.

(10) Patent No.: US 12,181,031 B2
(45) Date of Patent: Dec. 31, 2024

(54) GEARBOX FOR ELECTRIC OFF-ROAD VEHICLES

(71) Applicant: FCA US LLC, Auburn Hills, MI (US)

(72) Inventors: Sandeep Makam, Rochester Hills, MI (US); Pradeep Attibele, Ann Arbor, MI (US); Donald F Schmanski, Howell, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/191,924

(22) Filed: Mar. 29, 2023

(65) Prior Publication Data

US 2024/0328491 A1 Oct. 3, 2024

(51) Int. Cl.
*B60K 1/00* (2006.01)
*F16H 3/66* (2006.01)
*F16H 37/08* (2006.01)

(52) U.S. Cl.
CPC ............ *F16H 37/082* (2013.01); *B60K 1/00* (2013.01); *B60K 2001/001* (2013.01); *F16H 2200/0034* (2013.01); *F16H 2200/201* (2013.01); *F16H 2200/2035* (2013.01)

(58) Field of Classification Search
CPC ...... F16H 2200/2097; F16H 2200/2007–2017; F16H 2200/0034; F16H 2200/2035–2061; F16H 3/52–3/66; B60K 2001/001; B60K 17/00–20

See application file for complete search history.

(56) References Cited

U.S. PATENT DOCUMENTS

| | | | | |
|---|---|---|---|---|
| 6,623,397 | B1 * | 9/2003 | Raghavan | F16H 3/666 475/276 |
| 6,743,147 | B2 * | 6/2004 | Usoro | F16H 3/666 475/275 |
| 7,294,079 | B2 * | 11/2007 | Raghavan | F16H 3/728 475/5 |
| 2004/0053736 | A1 * | 3/2004 | Usoro | F16H 3/66 475/296 |
| 2004/0242368 | A1 * | 12/2004 | Tabata | F16H 3/666 475/296 |

(Continued)

FOREIGN PATENT DOCUMENTS

DE 102019214986 A1 * 4/2021 ............... B60K 1/02
WO WO-2018226700 A1 * 12/2018

*Primary Examiner* — Stacey A Fluhart
*Assistant Examiner* — Lillian T Nguyen
(74) *Attorney, Agent, or Firm* — Jeremy J. Klobucar

(57) ABSTRACT

A two-speed gearbox assembly includes a housing, a first planetary gear set configured to operably connect to an output of an electric motor, a second planetary gear set rotationally coupled to an output of the first planetary gear set, and a third gear set rotationally coupled to an output of the second planetary gearset. A first clutch is configured to selectively couple the first planetary gear set to the second planetary gear set, and a second clutch is configured to selectively ground a portion of the second planetary gear set to the housing. The gearbox assembly is selectively switchable between (i) an on-road first gear where the first clutch is engaged and the second clutch is disengaged, and (ii) an off-road second gear where the first clutch is disengaged and the second clutch is engaged to provide sustained high torque and low speed.

17 Claims, 3 Drawing Sheets

(56) References Cited

U.S. PATENT DOCUMENTS

| | | | |
|---|---|---|---|
| 2008/0015082 A1* | 1/2008 | Raghavan | B60L 50/61 |
| | | | 475/276 |
| 2018/0274644 A1* | 9/2018 | Sugiura | F16H 9/18 |
| 2019/0078665 A1* | 3/2019 | Beck | B60K 6/48 |
| 2020/0278011 A1* | 9/2020 | Torii | F16D 49/08 |
| 2021/0188066 A1* | 6/2021 | McGrew | B60K 17/08 |

* cited by examiner

GEARBOX FOR ELECTRIC OFF-ROAD VEHICLES

FIELD

The present application relates generally to gearboxes for electric vehicles and, more particularly, to a two-speed gearbox for electric vehicle off-road applications.

BACKGROUND

Vehicle off-road driving typically requires low speed and high torque operation over a sustained period of time. In vehicles with internal combustion engines, this is commonly achieved through additional gearing in the transfer case. However, battery electric vehicles typically have single speed gearboxes, which while providing great torque capability, are unable to provide sustained high torque. Such gearboxes may provide sustained high torque through higher ratio gearing, but this is not ideal for meeting range and performance requirements for on-road usage. Accordingly, while such gearing systems work well for their intended purpose, there is a desire for improvement in the relevant art.

SUMMARY

In accordance with one example aspect of the invention, a two-speed gearbox assembly for an electric drive vehicle is provided. The gearbox assembly includes a housing, a first planetary gear set configured to operably connect to an output of an electric motor, a second planetary gear set rotationally coupled to an output of the first planetary gear set, and a third gear set rotationally coupled to an output of the second planetary gearset. A gearbox output shaft is configured to rotationally couple the third gear set to a differential. A first clutch is configured to selectively couple the first planetary gear set to the second planetary gear set, and a second clutch is configured to selectively ground a portion of the second planetary gear set to the housing. The gearbox assembly is selectively switchable between (i) an on-road first gear where the first clutch is engaged and the second clutch is disengaged, and (ii) an off-road second gear where the first clutch is disengaged and the second clutch is engaged to provide sustained high torque and low speed.

In addition to the foregoing, the described gearbox assembly may include one or more of the following features: wherein the first planetary gear set includes a sun gear configured to rotationally couple to the electric motor output, a ring gear grounded to the housing, and a carrier selectively coupled to the second planetary gear set via the first clutch; wherein the second planetary gear set includes a sun gear rotationally coupled to the first planetary gear set, a ring gear rotationally coupled to the third gear set, and a carrier that is (i) selectively grounded to the housing via the second clutch, and (ii) selectively coupled to the first planetary gear set via the first clutch; and wherein the first clutch selectively couples the second planetary gear set carrier to a carrier of the first planetary gear set.

In addition to the foregoing, the described gearbox assembly may include one or more of the following features: wherein the third gear set is a planetary gear set; wherein the first and second planetary gear sets are coaxial; a single shifting mechanism configured to simultaneously shift each of the first clutch and the second clutch between engaged and disengaged states; wherein when the first clutch is in the engaged state, the second clutch is in the disengaged state, and wherein when the first clutch is in the disengaged state, the second clutch is in the engaged state; and wherein the gearbox assembly can only shift between the on-road first gear and the off-road second gear when the electric motor is at zero speed.

In addition to the foregoing, the described gearbox assembly may include one or more of the following features: wherein in the on-road first gear, the electric motor output rotates in a first direction, and wherein in the off-road second gear, the electric motor output rotates in a second direction opposite of the first direction; wherein the first and second clutches are dog clutches; and wherein the first and second clutches do not require friction elements, hydraulics, lubrication, or cooling.

In accordance with another example aspect of the invention, an electric vehicle is provided. In one example, the electric vehicle includes an electric motor having an output shaft, a differential configured to drive first and second axle shafts, and a two-speed gearbox assembly operably coupled between the electric motor and the differential. The gearbox assembly includes a housing, a first planetary gear set coupled to the electric motor output shaft, a second planetary gear set rotationally coupled to an output of the first planetary gear set, and a third gear set rotationally coupled to an output of the second planetary gearset. A gearbox output shaft is configured to rotationally couple the third gear set to the differential. A first clutch is configured to selectively couple the first planetary gear set to the second planetary gear set, and a second clutch is configured to selectively ground a portion of the second planetary gear set to the housing. The gearbox assembly is selectively switchable between (i) an on-road first gear where the first clutch is engaged and the second clutch is disengaged, and (ii) an off-road second gear where the first clutch is disengaged and the second clutch is engaged to provide sustained high torque and low speed.

In addition to the foregoing, the described electric vehicle may include one or more of the following features: wherein the first planetary gear set includes a sun gear configured to rotationally couple to the electric motor output shaft, a ring gear grounded to the housing, and a carrier selectively coupled to the second planetary gear set via the first clutch; and wherein the second planetary gear set includes a sun gear rotationally coupled to the first planetary gear set, a ring gear rotationally coupled to the third gear set, and a carrier that is (i) selectively grounded to the housing via the second clutch, and (ii) selectively coupled to the first planetary gear set via the first clutch.

In addition to the foregoing, the described electric vehicle may include one or more of the following features: wherein the first clutch selectively couples the second planetary gear set carrier to a carrier of the first planetary gear set; wherein in the on-road first gear, the electric motor output shaft rotates in a first direction, and wherein in the off-road second gear, the electric motor output shaft rotates in a second direction opposite of the first direction; wherein the third gear set is a planetary gear set, and wherein the first, second, and third planetary gear sets are coaxial; and wherein the gearbox assembly further includes a single shifting mechanism configured to simultaneously shift each of the first clutch and the second clutch between engaged and disengaged states, and wherein the gearbox assembly can only shift between the on-road first gear and the off-road second gear when the electric motor is at zero speed.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

According to the principles of the present application, systems and methods are described for a two-speed coaxial (concentric) electric drive gearbox for off-road electric drive applications. The gearbox is configured to provide on-road performance with a first or "HI" gear ratio, and sustained high torque, low speed off-road performance with a second or "LO" gear ratio. The electric drive gearbox provides a simple shifting mechanism that enables shifting between the HI and LO gear ratios only when the vehicle is stationary. As such, the shift mechanism does not require hydraulics and only requires a single manual action for the shift. This shifting at zero speed is required since the gearbox design requires the electric motor to spin in opposite directions for the two gears, even though the output motion is maintained to move the vehicle forward. Moreover, the shift mechanism acts as a protection feature to prevent accidental shift during on-road operations.

By providing two gearing ratios in the electric drive module to handle both on-road and off-road requirements, the design does not require a "middle" ratio, which would necessitate a traction inverter and electric motor with higher power and current/torque capability. Such an electric motor would inherently have a higher cost and larger volume, which could potentially present packaging challenges.

In this way, the gearbox design described herein provides a balance between efficiency and performance (e.g., acceleration, grade climbing prowess, vehicle top speed) between large and small motors, as larger electric motors tend to be less efficient for the same set of vehicle loads/speeds. Accordingly, on-road performance requirements can drive motor peak power requirements at an appropriate ratio, while the off-road requirements (including grade climbing capability) that typically drive peak torque requirements may be used to choose the low gear ratio. By taking advantage of the vehicle prime mover as an electric motor, which is capable of operation in both clockwise and counter-clockwise directions, the geartrain architecture can have a compact configuration. As such, the described design obviates conventional systems such as large motors with large ratio spreads, or expensive and complex individual electric drive modules for each wheel.

Figure 1:
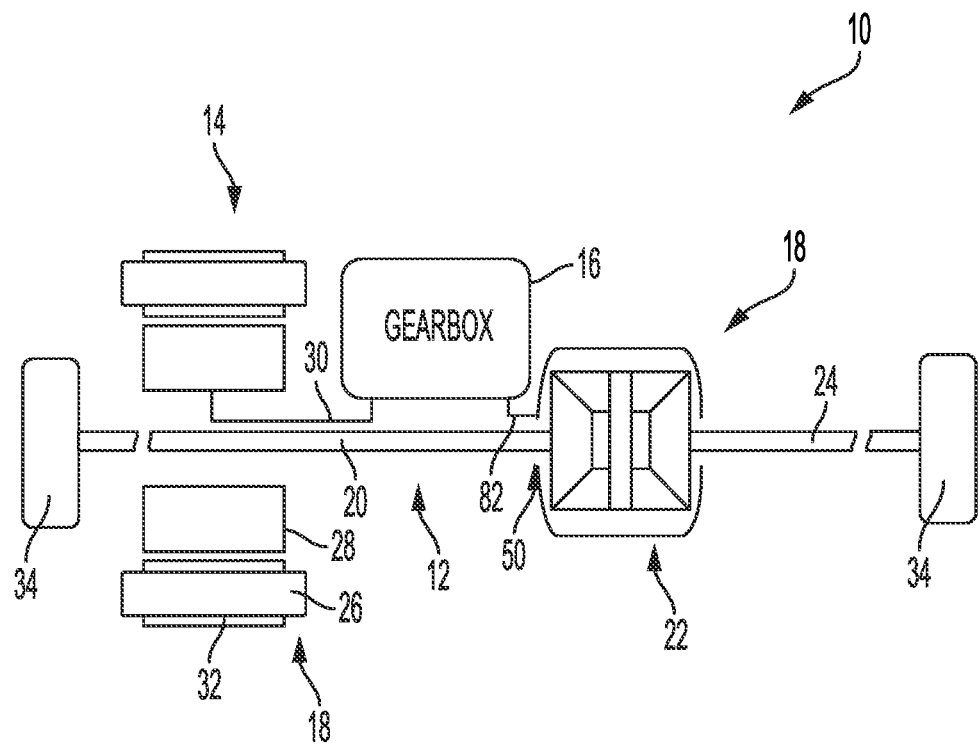
FIG. 1 is a schematic illustration of an example electric vehicle drivetrain having a two-speed coaxial gearbox for off-road electric drive applications, in accordance with the principles of the present application.

With initial reference to FIG. 1, a vehicle 10 is partially shown in accordance with the principles of the present disclosure is illustrated. In the example embodiment, vehicle 10 includes a propulsion system 12 that generally includes one or more drive units or motors 14 (e.g., electric traction motors) and a two-speed coaxial electric drive gearbox assembly 16. The electric motor 14 is selectively connectable via a traction inverter to a high voltage battery system (not shown) for powering the electric motor 14, and the gearbox assembly 16 is configured to transfer the generated drive torque to a driveline 18, including a first or left axle shaft 20, a differential 22, and a second or right axle shaft 24. In the example embodiment, the electric motor 14 generally includes a stator 26, a rotor 28, and a rotor output shaft 30. The stator 26 is fixed (e.g., to a housing 32) and the rotor 28 is configured to rotate relative to the stator 26 to drive the rotor shaft 30 and thus the vehicle axles 20, 24 (e.g., half shafts) and wheels 34.

As previously described, in the example embodiment, the gearbox assembly 16 is a compact two-speed coaxial electric drive gearbox that provides a first or HI gear for normal on-road driving, and a second or LO gear for sustained high torque, low speed off-road driving. In some examples, the gearbox assembly 16 design only allows for shifting between the HI and LO gears when the vehicle is stationary (e.g., due to mechanical constraints). This can prevent accidental shifting as the electric motor (prime mover) has to spin in opposite directions for the two ratios.

Figure 2:
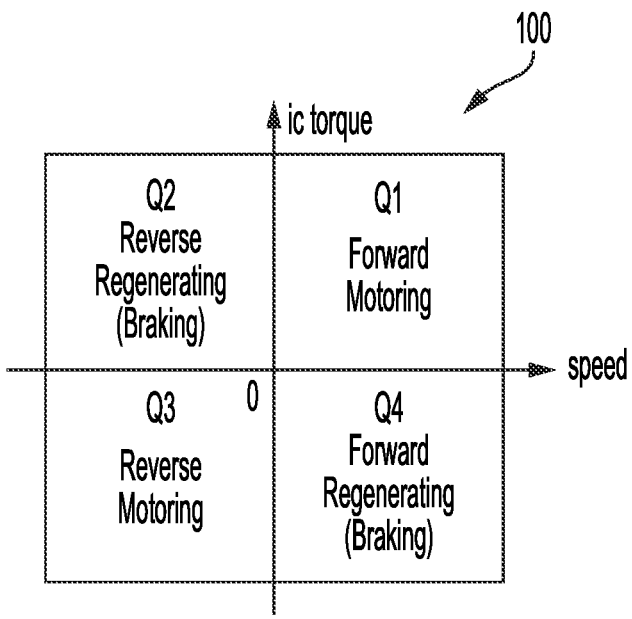
FIG. 2 is a schematic diagram of operational capabilities of an electric motor of the electric vehicle drivetrain shown in FIG. 1, in accordance with the principles of the present application.

As shown in the graph 100 illustrated in FIG. 2, where the y-axis represents torque output and the x-axis represents motor speed, the electric motor 14 is operable in four quadrants (Q1-Q4), unlike typical internal combustion engines, which only operate in the first quadrant. When operating the gearbox assembly 16 in the on-road gear, the electric motor 14 operates in quadrant Q1 for vehicle forward motion. In the "LO mode" off-road gear, the electric motor 14 operates in quadrant Q3 for vehicle forward motion. By taking advantage of this electric motor behavior in vehicle 10, the architecture of gearbox assembly 16 is advantageously simplified and more compact.

Figure 3:
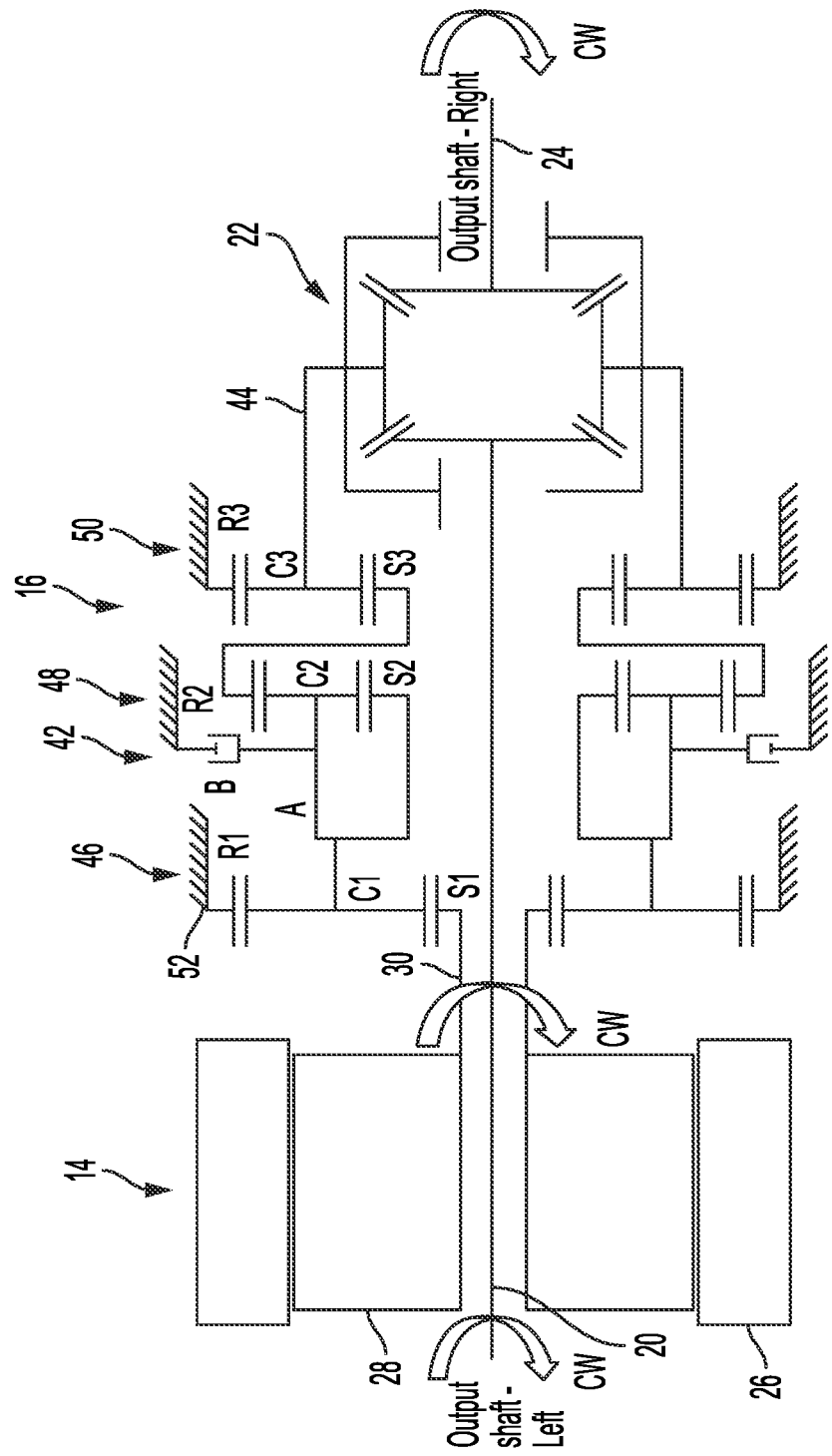
FIG. 3 is a schematic illustration of the example gearbox shown in FIG. 1 in an on-road first gear, in accordance with the principles of the present application.
Figure 4:
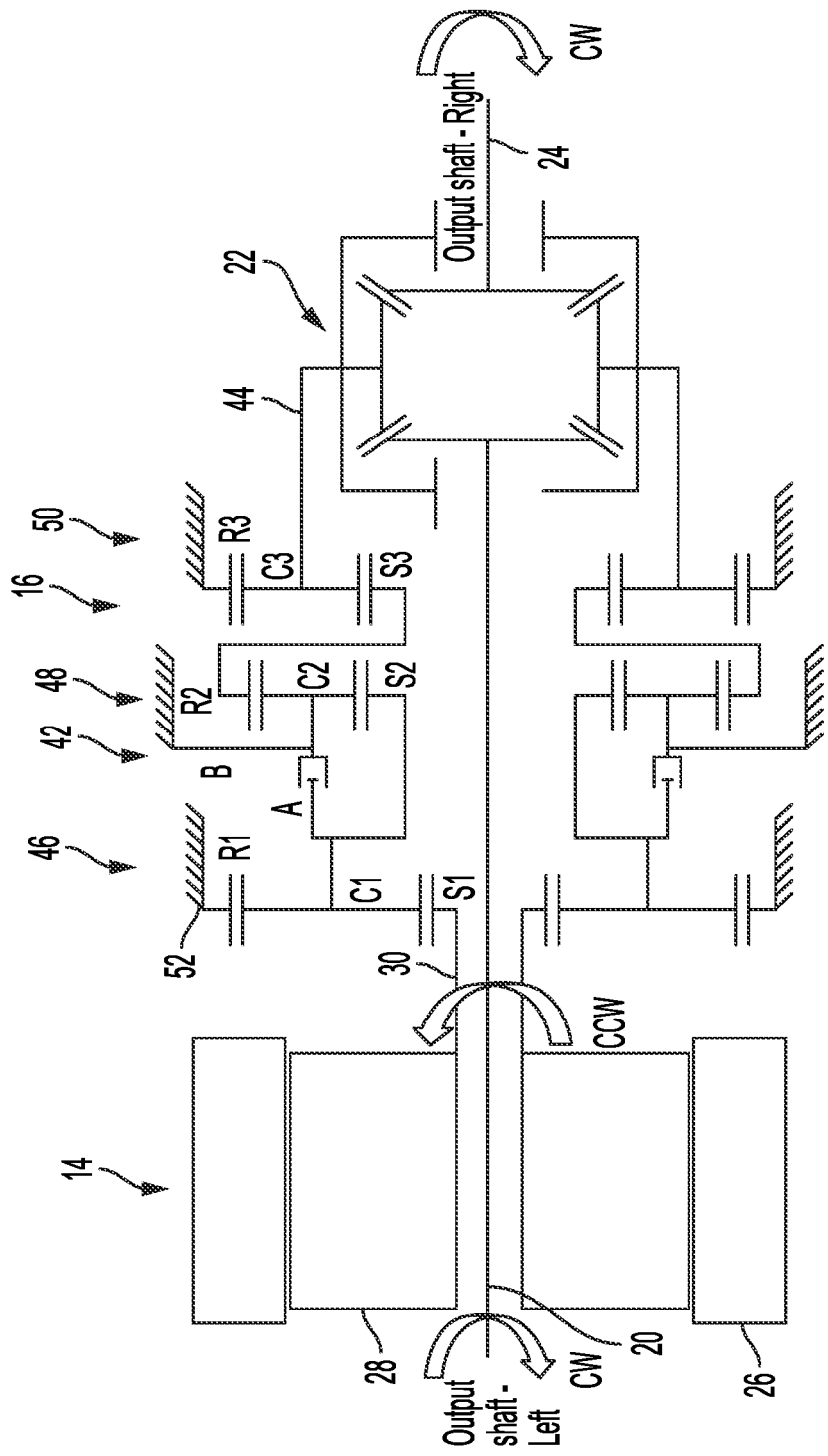
FIG. 4 is a schematic illustration of the example gearbox shown in FIG. 1 in an off-road second gear, in accordance with the principles of the present application.

With reference now to FIGS. 3 and 4, the two-speed coaxial electric drive gearbox assembly 16 will be described in more detail. FIG. 3 illustrates the gearbox assembly 16 in the HI gear on-road operation, and FIG. 4 illustrates the gearbox assembly 16 in the LO gear off-road operation.

As shown in FIGS. 3 and 4, the gearbox assembly 16 is linked to the electric motor 14 through an output shaft 30. Rotational output from the motor output shaft 30 is received by the gearbox assembly 16, which then transfers the rotational output through a gear set 42 to a gearbox output shaft 44. Rotation from output shaft 44 is then directed to the drivetrain of vehicle 10 via the differential 22. In the example embodiment, the gear set 42 includes a first planetary gear set 46, a second planetary gear set 48, a third planetary gear set 50, and a housing 52. The three planetary gear sets each generally include a sun gear 'S', a carrier 'C' supporting planet gears, and a ring gear 'R', where suffixes '1', '2' and '3' refer to the first, second, and third planetary gear sets. However, in some examples, third planetary gear set 50 may have an alternative configuration such as helical gears on an offset axis or a double planetary gear set.

The gearbox assembly 16 also includes a first Clutch A and a second Clutch B. In one example implementation, clutches A and B are dog clutches actuated by a shift mechanism (not shown), which may be a mechanical shift lever movable in on/off positions with a single axial translation mechanism. In this way, the shift mechanism does not require friction elements, hydraulics, lubrication, or cooling. However, it will be appreciated that first Clutch A and/or second Clutch B may be any type of suitable clutch that enables gearbox assembly 16 to function as described herein.

In the illustrated example, the first planetary gear set 46 is positioned between the motor output shaft 30 and the second planetary gear set 48. The sun gear 'S1' is connected for common rotation with motor output shaft 30, ring gear 'R1' is grounded to housing 52, and carrier 'C1' is connected to sun gear 'S2' and selectively connected to carrier 'C2' via Clutch A.

In the example embodiment, the second planetary gear set 48 is positioned between the first planetary gear set 46 and the third planetary gear set 50. The carrier 'C2', which is selectively connected to carrier 'C1', is also selectively grounded to the housing 52 via Clutch B. Sun gear 'S2' is connected to carrier 'C1', and ring gear 'R2' is connected to sun gear 'S3'.

In the example implementation, the third planetary gear set 50 is positioned between the second planetary gear set 48 and differential 22. Sun gear 'S3' is connected to ring gear 'R2', ring gear 'R3' is grounded to the housing 52, and carrier 'C3' is connected to gearbox output shaft 44 to transfer rotational motion to axle shafts 20, 24 via the differential 22. However, in some examples, third planetary gear set 50 may have an alternative configuration such as helical gears on an offset axis, which then connects to the differential 22.

With reference now to FIG. 3, operation in the on-road HI gear will be described in more detail. In the example operation, a driver controlled shifting mechanism (not shown) is actuated to close/engage Clutch A and open/disengage Clutch B. Rotation from motor output shaft 30 in a first direction (e.g., clockwise) is transferred to the first planetary gear set 46, which then transfers the rotation to the second planetary gear set 48 via the 'C1-C2' connection at Clutch A. Rotation is then transferred to the third planetary gear set 50, and through gearbox output shaft 44 to the differential 22, which rotates the axle shafts 20, 24 and vehicle wheels 34 in the forward direction.

To shift operation to the off-road LO gear, the vehicle 10 must be stationary (e.g., motor zero speed) since the operation requires the motor output shaft 30 to rotate in a second opposite direction (e.g., counter clockwise). In this way, the gearbox assembly 16 leverages the capability of the electric motor 14 to operate in both quadrant Q1 and quadrant Q3 (FIG. 2). In one example, the shifting is achieved via controller (not shown) by a single translational or rotational actuation of the shifting mechanism by the operator such as by a button/switch or touchscreen display in the vehicle interior. The shift simultaneously changes the engagement status of both Clutch A and Clutch B (e.g., dog clutches). In one example, a sleeve-collar type arrangement is sufficient to provide the shifting mechanism and actuation.

With reference now to FIG. 4, operation in the off-road LO gear will be described in more detail. In the example operation, the driver controlled shifting mechanism is actuated to open/disengage Clutch A and close/engage Clutch B. The electric motor 14 is operated in the direction opposite of the on-road HI gear (e.g., counter clockwise), and rotation from motor output shaft 30 is transferred to the first planetary gear set 46. Rotation is then transferred from carrier 'C1' to the second planetary gear set 48 via sun gear 'S2' while carrier 'C2' is grounded to housing 52 via Clutch B. Rotational output from ring gear 'R2' is then transferred to the third planetary gear set 50, and through gearbox output shaft 44 to the differential 22, which rotates the axle shafts 20, 24 and vehicle wheels 34 in the forward direction.

In one example implementation, gearbox assembly 16 has a gear ratio of 14.71 in the on-road HI gear, and a gear ratio of 29.71 in the off-road LO gear. To achieve these ratios, sun gear 'S1' has 23 teeth, ring gear 'R1' has 89 teeth, sun gears 'S2' and 'S3' have 43 teeth, and ring gears 'R2' and 'R3' have 87 teeth. However, it will be appreciated that gearbox assembly 16 may have various other gear ratios and tooth number configurations. For example, in another configuration, sun gear 'S1' has 23 teeth, ring gear 'R1' has 89 teeth, sun gears 'S2' and 'S3' have 29 teeth, and ring gears 'R2' and 'R3' have 97 teeth to achieve ratios of 16.29 and 38.19.

Described herein are systems and methods for a two-speed coaxial electric drive gearbox assembly for an electric vehicle. The two-speed gearbox assembly is configured to provide both an on-road gear ratio as well as a sustained high torque, low speed off-road gear ratio. To achieve the two-speed functionality, the gearbox assembly includes three planetary gear sets with two selectively, oppositely engageable clutches. The first clutch selectively engages the carriers of the first and second planetary gear sets, and the second clutch selectively engages and grounds the carrier of the second planetary gear set. Moreover, the gearbox assembly design only allows shifting between the on-road and off-road gears when the vehicle is stationary to prevent accidental shifting. As such, the described gearbox assembly advantageously does not require individual electric drive modules for each wheel, complex controls/mechanisms, or clutch friction elements, hydraulics, lubrication, or cooling.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A two-speed gearbox assembly for an electric drive vehicle, the gearbox assembly comprising:
 a housing;
 a first planetary gear set configured to operably connect to an output of an electric motor;
 a second planetary gear set rotationally coupled to an output of the first planetary gear set;

a third gear set rotationally coupled to an output of the second planetary gearset;
a gearbox output shaft configured to rotationally couple the third gear set to a differential;
a first clutch configured to selectively couple the first planetary gear set to the second planetary gear set; and
a second clutch configured to selectively ground a portion of the second planetary gear set to the housing,
wherein the gearbox assembly is selectively switchable between (i) an on-road, forward first gear where the first clutch is engaged and the second clutch is disengaged, and (ii) an off-road, forward second gear where the first clutch is disengaged and the second clutch is engaged to provide sustained high torque and low speed,
wherein the first planetary gear set includes a sun gear configured to rotationally couple to the electric motor output, a ring gear grounded to the housing, and a carrier selectively coupled to the second planetary gear set via the first clutch, and
wherein the second planetary gear set includes a sun gear rotationally coupled to the first planetary gear set, a ring gear rotationally coupled to the third gear set, and a carrier that is (i) selectively grounded to the housing via the second clutch, and (ii) selectively directly coupled to the first planetary gear set carrier via the first clutch.

2. The gearbox assembly of claim 1, wherein the third gear set is a planetary gear set.

3. The gearbox assembly of claim 1, wherein the first and second planetary gear sets are coaxial.

4. The gearbox assembly of claim 1, wherein when the first clutch is in the engaged state, the second clutch is in the disengaged state, and
wherein when the first clutch is in the disengaged state, the second clutch is in the engaged state.

5. The gearbox assembly of claim 1, wherein the first and second clutches are dog clutches.

6. The gearbox assembly of claim 1, wherein the first and second clutches do not require friction elements, hydraulics, lubrication, or cooling.

7. A two-speed gearbox assembly for an electric drive vehicle, the gearbox assembly comprising:
a housing;
a first planetary gear set configured to operably connect to an output of an electric motor;
a second planetary gear set rotationally coupled to an output of the first planetary gear set;
a third gear set rotationally coupled to an output of the second planetary gearset;
a gearbox output shaft configured to rotationally couple the third gear set to a differential;
a first clutch configured to selectively couple the first planetary gear set to the second planetary gear set; and
a second clutch configured to selectively ground a portion of the second planetary gear set to the housing,
wherein the gearbox assembly is selectively switchable between (i) an on-road first gear where the first clutch is engaged and the second clutch is disengaged, and (ii) an off-road second gear where the first clutch is disengaged and the second clutch is engaged to provide sustained high torque and low speed, and
wherein the gearbox assembly can only shift between the on-road first gear and the off-road second gear when the electric motor is at zero speed.

8. The gearbox assembly of claim 7, wherein the first planetary gear set includes a sun gear configured to rotationally couple to the electric motor output, a ring gear grounded to the housing, and a carrier selectively coupled to the second planetary gear set via the first clutch.

9. The gearbox assembly of claim 7, wherein the second planetary gear set includes a sun gear rotationally coupled to the first planetary gear set, a ring gear rotationally coupled to the third gear set, and a carrier that is (i) selectively grounded to the housing via the second clutch, and (ii) selectively coupled to the first planetary gear set via the first clutch.

10. The gearbox assembly of claim 9, wherein the first clutch selectively couples the second planetary gear set carrier to a carrier of the first planetary gear set.

11. The gearbox assembly of claim 7, wherein the third gear set is a planetary gear set, and
wherein the first and second planetary gear sets are coaxial.

12. The gearbox assembly of claim 7, wherein when the first clutch is in the engaged state, the second clutch is in the disengaged state, and
wherein when the first clutch is in the disengaged state, the second clutch is in the engaged state.

13. A two-speed gearbox assembly for an electric drive vehicle, the gearbox assembly comprising:
a housing;
a first planetary gear set configured to operably connect to an output of an electric motor;
a second planetary gear set rotationally coupled to an output of the first planetary gear set;
a third gear set rotationally coupled to an output of the second planetary gearset;
a gearbox output shaft configured to rotationally couple the third gear set to a differential;
a first clutch configured to selectively couple the first planetary gear set to the second planetary gear set; and
a second clutch configured to selectively ground a portion of the second planetary gear set to the housing,
wherein the gearbox assembly is selectively switchable between (i) an on-road first gear where the first clutch is engaged and the second clutch is disengaged, and (ii) an off-road second gear where the first clutch is disengaged and the second clutch is engaged to provide sustained high torque and low speed,
wherein in the on-road first gear, the electric motor output rotates in a first direction, and
wherein in the off-road second gear, the electric motor output rotates in a second direction opposite of the first direction.

14. The gearbox assembly of claim 13, wherein the first planetary gear set includes a sun gear configured to rotationally couple to the electric motor output, a ring gear grounded to the housing, and a carrier selectively coupled to the second planetary gear set via the first clutch.

15. The gearbox assembly of claim 13, wherein the second planetary gear set includes a sun gear rotationally coupled to the first planetary gear set, a ring gear rotationally coupled to the third gear set, and a carrier that is (i) selectively grounded to the housing via the second clutch, and (ii) selectively coupled to the first planetary gear set via the first clutch.

16. The gearbox assembly of claim 15, wherein the first clutch selectively couples the second planetary gear set carrier to a carrier of the first planetary gear set.

17. The gearbox assembly of claim 13, wherein the third gear set is a planetary gear set,
wherein the first and second planetary gear sets are coaxial, wherein when the first clutch is in the engaged state, the second clutch is in the disengaged state, and
wherein when the first clutch is in the disengaged state, the second clutch is in the engaged state.

\* \* \* \* \*